Dec. 22, 1931.  A. NEVEU  1,837,473
SLACK ADJUSTING DEVICE
Filed Sept. 20, 1929   2 Sheets-Sheet 1

INVENTOR
ANSELME NEVEU
BY *Wm. M. Cady*
ATTORNEY

Dec. 22, 1931.  A. NEVEU  1,837,473
SLACK ADJUSTING DEVICE
Filed Sept. 20, 1929  2 Sheets-Sheet 2
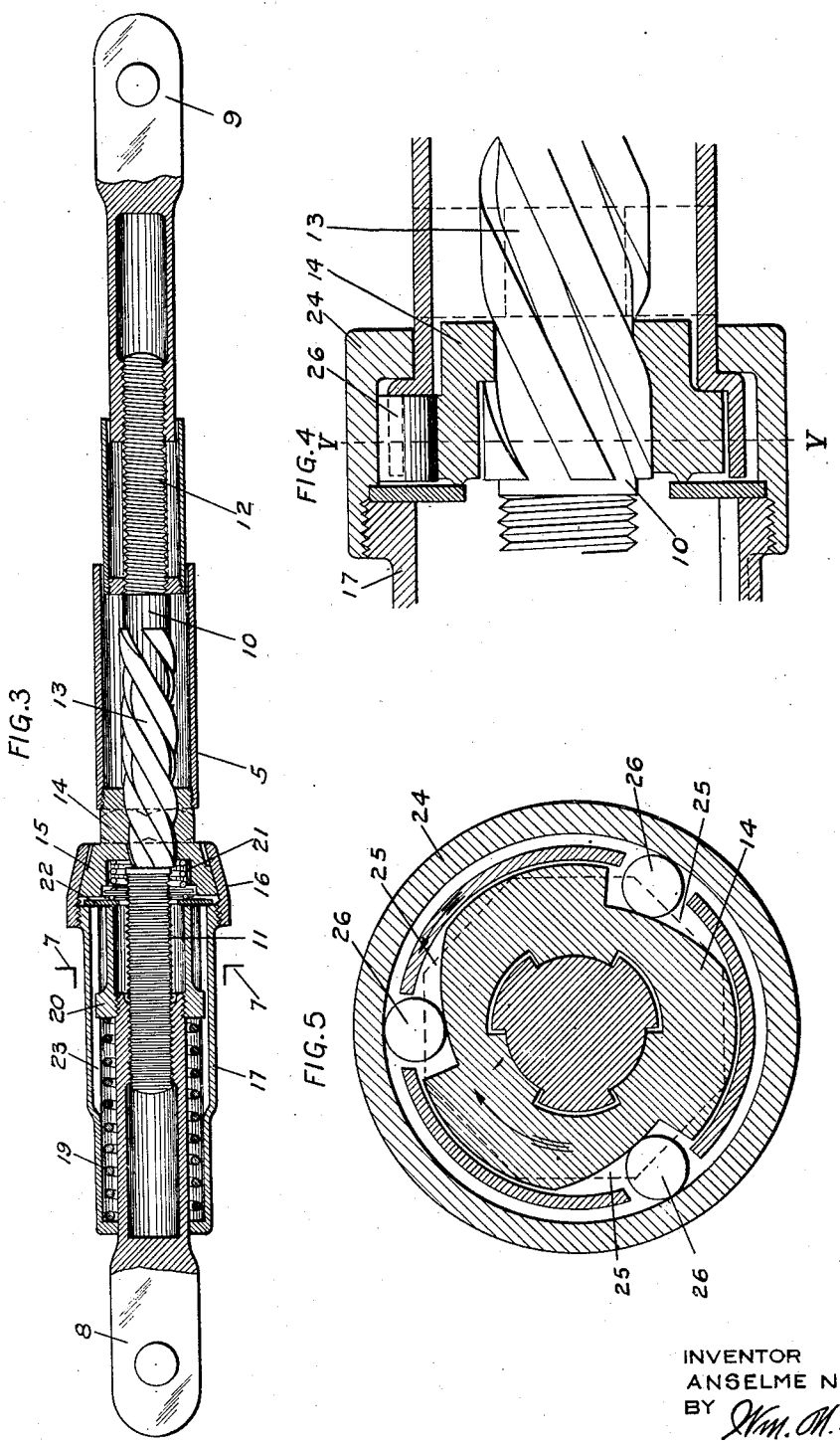
INVENTOR
ANSELME NEVEU
BY *Wm. M. Cady*
ATTORNEY Patented Dec. 22, 1931

1,837,473

UNITED STATES PATENT OFFICE

ANSELME NEVEU, OF LIVRY-GARGAN, FRANCE, ASSIGNOR TO THE WESTINGHOUSE AIR BRAKE COMPANY, OF WILMERDING, PENNSYLVANIA, A CORPORATION OF PENNSYLVANIA

SLACK ADJUSTING DEVICE

Application filed September 20, 1929, Serial No. 393,964, and in France September 21, 1928.

This invention relates to devices for automatically taking up the slack in the rigging of braking apparatus and has for its object to provide an improved device of this general character.

The invention relates more particularly to the type of automatic slack adjusting devices adapted to be connected between a brake lever and the brake rigging or between a pair of brake levers so as to constitute an adjustable transmission or tie rod and comprising a central portion provided at its end with right and left-handed screw threads adapted to engage with corresponding internally screw threaded end portions so that by rotating the central portion in one direction or the other the effective length of the device as a whole can be increased or decreased.

According to the principal feature of the invention the central portion of the rotatable rod of the device is provided with a relatively coarse thread of steep pitch adapted to engage with a surrounding nut forming one member of a clutch device which is arranged to be automatically disengaged during the application of the brakes when the stroke of the brake cylinder piston exceeds a predetermined amount, so as to permit the nut to take up a different position on the screw thread, the clutch device being re-engaged during the release of the brakes so that the nut causes the central portion of the rod to be rotated and thus reduce the effective length of the device.

The invention is illustrated by way of example in the accompanying drawings,

Figure 1 of which is a diagrammatic view of one form of fluid pressure braking apparatus provided with a slack adjusting device constructed in accordance with the invention, showing the general arrangement of the slack adjusting device relative to the other portions of the braking equipment, Figure 2 being a similar view showing the invention as applied to a different type of braking equipment.

Figure 3 is a view in longitudinal section of the automatic slack adjusting device employed in the apparatus of Figures 1 and 2, Figure 4 being a similar view illustrating a modified construction of a portion of the device shown in Figure 3.

Figure 5 is a view in transverse section on the line V—V of Figure 4.

Figure 1:
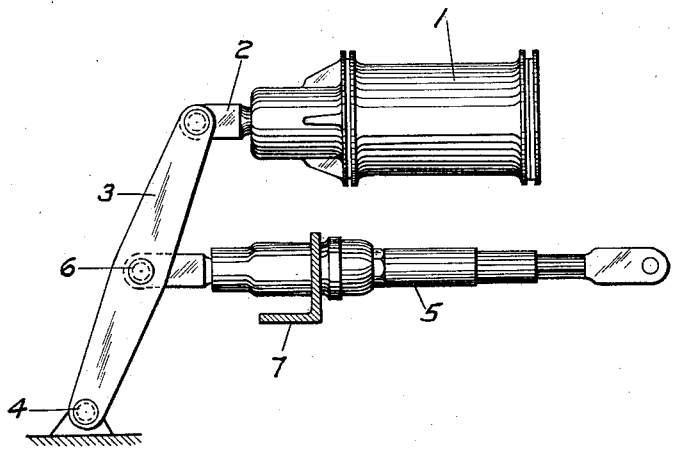

Referring now to Figure 1 the brake cylinder of the apparatus is indicated at 1 as mounted on the frame of the vehicle, the brake cylinder piston 2 being pivotally connected to one end of a brake lever 3, the opposite end of which is pivotally connected to the frame as indicated at 4. The slack adjusting device 5 is shown as pivotally connected at one end to a point 6 in the brake lever 3, the opposite end of the slack adjusting device 5 being connected to the brake transmission rod (not shown) in the usual manner. A fixed stop 7 mounted on the vehicle frame is provided adapted to control the operation of the slack adjusting device 5 as will now be described with reference to Figure 3.

Referring now to Figure 3 it will be seen that the slack adjusting device 5 comprises two internally screw-threaded tubular members 8, 9, one 8, of which is pivotally connected to the brake lever 3 as above described, the other member 9 being connected to a transmission rod (not shown) leading to the brake shoes. The members 8, 9 are adjustably connected together by means of a central rod 10, the ends of which are provided with left and right-handed screw-threaded portions 11, 12 adapted to co-operate with corresponding internal screw-threaded portions of the members 8, 9. The central portion of the rod 10 is provided with a relatively coarse screw-thread 13 of steep pitch adapted to co-operate with a corresponding internal screw-thread formed in a nut member 14. The latter is secured to or formed integral with a conical member 15 adapted to co-operate with a hollow conical member 16, the members 15, 16 constituting a clutch device operated in the manner hereinafter described. The outer clutch member 16 is secured to a sleeve or casing 17 containing a helical compression spring 19 surrounding the tubular member 8, the spring 19 being interposed between the end of the sleeve 17 and an inner sleeve 20 mounted at one end upon the tubular member 8.

A second spring 21 is provided located in a central recess in the clutch member 15, the spring 21 being interposed between the clutch member and a disc 22 secured to the end of the sleeve 17. The inner sleeve 20 is prevented from rotation relative to the outer sleeve 17 by means of ribs 23, permitting the sleeve 20 to slide with reference to the outer sleeve 17.

The operation of this form of slack adjusting device is as follows:—

Assuming that the braking equipment is in its release position as shown in Figure 1, when fluid under pressure is supplied to the brake cylinder 1, the brake cylinder piston will be moved outwards, the piston rod 2 causing the brake lever 3 to be angularly displaced towards the left carrying with it the slack adjusting device 5 and thereby exerting braking pressure upon the wheels. Assuming that the brake blocks are not unduly worn the movement towards the left of the slack adjusting device 5 will be insufficient to bring the left hand end of the outer clutch member 16 into engagement with the stop 7 so that under these conditions the clutch members 15, 16 will remain held in engagement with one another under the action of the spring 21 and the parts of the slack adjusting device 5 will not be moved relative to one another during either the application or release movements of the braking equipment.

In the event however of the brake blocks being worn to such an extent that excessive movement of the brake cylinder piston rod 2 is required to bring the brake blocks into engagement with the wheels, the movement towards the left of the slack adjusting device 5 will cause the left hand end of the outer clutch member 16 to engage with the stop 7 during the application of the brakes and further movement of the clutch member 16 towards the left is thus prevented. The continued movement towards the left of the rod 10 will however cause the clutch member 15 to be moved slightly towards the left against the action of the spring 21 thereby releasing the conical surface of the clutch members 15, 16 from engagement with one another. As a result the screw-thread 13 moves towards the left relative to the nut 14 causing the rotation of this nut together with the inner clutch member 15, this rotation being permitted by the disengagement of the clutch members 15, 16 as above explained. The continued movement towards the left of the rod 10 carries with it the inner sleeve 20 which slides relative to the outer sleeve 17, which is held stationary owing to the action of the stop 7, thereby compressing the spring 19.

It will be evident that the result of the movement above described is to displace the screw-thread 13 with reference to the nut 14 towards the left.

When the brakes are being released, the lever 3, due to the pressure of the usual release (not shown) is rotated in a clockwise direction about its pivot or fulcrum 4. The initial movement of the lever 3 in this direction causes the members 8 and 9 and rod 10 to move as a unit in the direction toward the right hand and relative to the casing 17 and outer clutch member 16, which are held in engagement with the stop 7 by the outward pressure of the compressed spring 19. Since the inner end of the spring 19 engages the sleeve 20 and this sleeve is secured to the member 8, the inward pressure of the spring may assist in moving the members 8 and 9 and rod 10 toward the right hand for a limited distance. As the rod 10 is thus initially moved, the pressure of the spring 21 causes the inner clutch member 15 to move with the rod so that the rod 10 will not impart rotary movement to the nut 14, thus preventing longitudinal movement of the rod relative to the nut during this initial movement. By reason of this initial movement, the inner clutch member 15 is caused to re-engage with the outer clutch member 16, with the result that rotation of the nut 14 relative to the casing 17 is prevented. When the inner and outer clutch members 15 and 16 respectively are thus in engagement with each other, the rod 10, as it continues to be moved toward the right hand will, due to its screw-threaded engagement with the nut 14 which is now held stationary, be caused to rotate in a direction to cause the screw-threaded portions 11 and 12 to enter to a greater extent the internally screw-threaded tubular members 8 and 9 respectively, and thus shorten the effective length of the slack adjusting device. The rotation of the rod 10 will continue until such time as the inner end of the sleeve 20 engages the plate 22, at which time the spring 19 will be ineffective to maintain the outer clutch member 16 in engagement with the stop 7 so that the further releasing movement of the lever 3 causes the several parts of the slack adjusting device to move toward the right hand as a unit out of cooperation with the stop 7 to normal release position.

The longitudinal movement of the rod 10 with its consequent enforced rotation relative to the nut 14 will evidently cease as soon as the slack adjusting device as a whole has moved the outer clutch member 16 from engagement with the stop 7 whereupon the shortening action above described ceases and the slack adjusting device moves towards the right as a whole without relative movement of the various parts thereof.

Referring now to the modified construction shown in Figures 4 and 5 the outer casing 17 is shown as provided with a cylindrical extension 24 enclosing the nut 14, the outer periphery of which is cut away into wedge-shaped recesses indicated at 25, each containing a roller 26 interposed between the base of the recess 25 and the inner periphery of the extension 24. It will be understood that in this case the rollers 26 permit free rotation of the nut 14 in a clockwise direction as shown by the arrow in Figure 5, thus permitting the screw-thread 13 to move towards the left relative to the nut 14 when the left hand edge of the extension 24 engages with the stop 7, whereas rotation of the nut 14 relative to the extension 24 in the opposite direction is prevented thereby causing the movement of the adjusting device during release to rotate the rod 10 by the action of the nut 14 upon the screw-thread 13.

Figure 2:
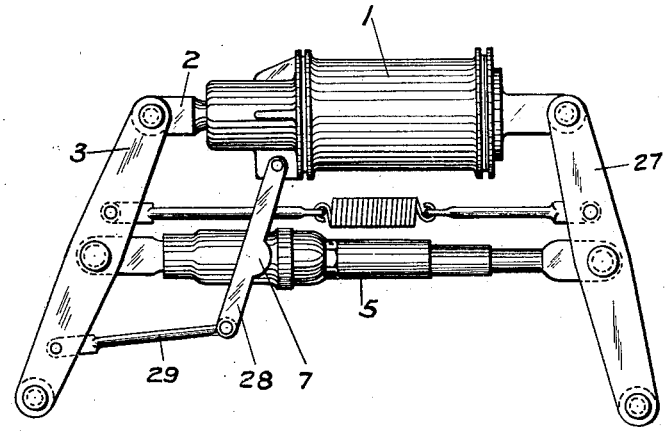

The improved slack adjusting device of the invention may also be applied to braking equipment arranged as shown in Figure 2 in which case the slack adjusting device 5 forms a tie rod cross-connecting the usual brake levers 3, 27. In this case the stop 7 is constituted by a projection on a link 28 one end of which is pivoted to the brake cylinder 1, the other end of the link 28 being pivotally connected by means of a rod 29 to a point in the brake lever 3.

The operation of this arrangement will be evident from an inspection of Figure 2 from which it will be seen that in the event of excessive outward movement of the brake cylinder piston, the stop 7 will be brought into engagement with the slack adjusting device so as to cause the operation of the latter to shorten the effective length of the tie rod constituted by the slack adjusting device 5 as above explained.

It will be evident that in either the construction shown in Figure 3 or in that shown in Figures 4 and 5 the effective length of the slack adjusting device can be adjusted manually when required by rotating the central rod 10 by means of the nut 14.

The invention is not limited to the particular construction and arrangement of parts above described and illustrated which may be varied as desired in order to meet particular conditions of operation.

Having now described my invention, what I claim as new and desire to secure by Letters Patent, is:—

1. In an automatic slack adjuster for brakes, the combination with a plurality of brake rigging elements, of a rod operatively connecting said elements and comprising a rotatable central portion and non-rotatable end portions having screw-threaded connections with said central portion for causing the effective length of the rod to be shortened to take up slack when said central portion is rotated, an adjusting member mounted on said central portion rotatable by and relative to said central portion when said rod is moved longitudinally in one direction beyond a predetermined limit for permitting said central portion to change position with relation to said member, and means operative when said rod is moved longitudinally in the opposite direction for holding said member stationary against rotation so as to rotate said central portion as the rod is moved longitudinally.

2. In an automatic slack adjuster for brakes, the combination with a plurality of brake rigging elements, of a rod operatively connecting said elements and comprising a rotatable central portion and non-rotatable end portions having screw-threaded connections with said central portion for causing the effective length of the rod to be shortened to take up slack when said central portion is rotated, an adjusting member mounted on said central portion rotatable by and relative to said central portion when said rod is moved longitudinally in one direction beyond a predetermined limit for permitting said central portion to change position with relation to said member, and means operative when said rod is moved longitudinally in the opposite direction a distance corresponding to the distance the rod has been moved beyond said predetermined limit for holding said member stationary against rotation so as to rotate said central portion as the rod is moved longitudinally.

3. In an automatic slack adjuster for brakes, the combination with a plurality of brake rigging elements, of a rod operatively connecting said elements and comprising a rotatable central portion and non-rotatable end portions having screw-threaded connections with said central portion for causing the effective length of the rod to be shortened to take up slack when said central portion is rotated, and adjusting member mounted on said central portion rotatable by and relative to said central portion when said rod is moved longitudinally in one direction beyond a predetermined limit for permitting said central portion to change position with relation to said member, and friction clutch means operative when said rod is moved longitudinally in the opposite direction for holding said member stationary against rotation, so that said member will impart a rotary movement to said central portion as the rod is moved longitudinally.

4. In an automatic slack adjuster for brakes, the combination with a plurality of brake rigging elements, of a rod operatively connecting said elements and comprising a rotatable central portion and non-rotatable end portions having screw-threaded connections with said central portion for causing the effective length of the rod to be shortened to take up slack when said central portion is rotated, an adjusting member mounted on said central portion rotatable by and relative to said central portion when said rod is moved longitudinally in brake applying direction and there is slack to be taken up for permitting said central portion to change position relative to said member, and means for maintaining said member stationary against rotation when said rod is moved longitudinally in brake releasing direction and there is slack to be taken up, said member when held stationary cooperating with said central portion to cause the central portion to rotate to take up slack.

5. In an automatic slack adjuster for brakes, the combination with a plurality of brake rigging elements, of a rod operatively connecting said elements and comprising a rotatable central portion and non-rotatable end portions having screw-threaded connections with said central portion for causing the effective length of the rod to be shortened to take up slack when said central portion is rotated, a friction clutch member carried by said central portion of the rod and rotatable thereby and relative thereto when the rod is moved in brake applying direction and there is slack to be taken up, and a non-rotatable clutch member into frictional engagement with which said rotatable clutch member is moved when said rod is moved in brake releasing direction and there is slack to be taken up, said rotatable clutch member when in engagement with the non-rotatable clutch member being held against rotation and thereby causing said central portion of the rod to rotate to take up slack.

6. In an automatic slack adjuster for brakes, the combination with a plurality of brake rigging elements, of a rod operatively connecting said elements and movable longitudinally in one direction in applying the brakes and movable longitudinally in the opposite direction in releasing the brakes, said rod comprising non-rotatable end portions and also comprising a rotatable central portion having screw-threaded connections with said end portions whereby the rotation of said central portion causes the effective length of said rod to be shortened to take up slack, and an adjusting member movable with said central portion of the rod when there is no slack to be taken up and operative to permit the longitudinal movement of said rod relative thereto in the brake applying direction when there is slack to be taken up and the rod is moved beyond a predetermined limit and for imparting rotary movement to the central portion of the rod when the rod is being returned in the brake releasing direction.

7. In an automatic slack adjuster for brakes, the combination with a plurality of brake rigging elements, of a rod operatively connecting said elements and movable longitudinally in one direction in applying the brakes and movable in the opposite direction in releasing the brakes, said rod comprising a rotatable central portion and also comprising non-rotatable end portions having screw-threaded connections with said central portion whereby the effective length of said rod is shortened when the central portion is rotated, adjusting means carried by said rod and movable therewith as a unit in the brake applying direction when there is no slack to be taken up and the rod is not moved beyond a predetermined limit and operative to permit said rod to move longitudinally relative thereto when there is slack to be taken up and the rod is moved beyond said predetermined limit and further operative to cause said central portion of the rod to rotate as said rod is returned in the brake releasing direction, and means for limiting the rotation of said central portion of the rod.

8. In an automatic slack adjuster for brakes, the combination with a plurality of brake rigging elements, of a rod operatively connecting said elements and movable longitudinally in one direction in applying the brakes and movable in the opposite direction in releasing the brakes, said rod comprising a rotatable central portion and also comprising non-rotatable end portions having screw-threaded connections with said central portion whereby the effective length of said rod is shortened when the central portion is rotated, adjusting members carried by said rod and movable therewith as a unit when there is no slack to be taken up and the rod is not moved beyond a predetermined limit, a stop for arresting the unitary movement of said members with said rod when said rod is moved beyond said predetermined limit and operative to permit the rod to move longitudinally relative thereto, said adjusting members being operative to cause the central portion of said rod to rotate when the rod is moved in the brake releasing direction and there is slack to be taken up, and means cooperating with said rod and one of said adjusting members for limiting the rotation of said central portion of the rod.

9. In an automatic slack adjuster for brakes, the combination with a plurality of brake rigging elements, of a rod operatively connecting said elements and movable longitudinally in one direction in applying the brakes and movable in the opposite direction in releasing the brakes, said rod comprising a rotatable central portion and also comprising non-rotatable end portions having screw-threaded connections with said central portion whereby the effective length of said rod is shortened when the central portion is rotated, adjusting members carried by said rod and movable therewith as a unit when there is no slack to be taken up and the rod is not moved beyond a predetermined limit, a stop for arresting the unitary movement of said members with said rod when said rod is moved beyond said predetermined limit and operative to permit the rod to move longitudinally relative thereto, said adjusting members being operative to cause the central portion of said rod to rotate when the rod is moved in the brake releasing direction and there is slack to be taken up, means for maintaining one of said members in engagement with said stop when the central portion of the rod is being rotated, and means adapted to engage the last mentioned member for limiting the rotation of the central portion of the rod and for moving the last mentioned member out of engagement with said stop.

In testimony whereof I have hereunto set my hand.

ANSELME NEVEU.